US006055520A

United States Patent [19]

Heiden et al.

[11] Patent Number: 6,055,520

[45] Date of Patent: Apr. 25, 2000

[54] MAILPIECE IMPRINTED WITH A DELIVERY ADDRESS ONLY IN A FORM WHICH IS NOT HUMAN READABLE AND METHOD AND SYSTEM FOR PRODUCING SAME

[75] Inventors: Gary M Heiden, Shelton; Richard W Heiden, Huntington, both of Conn.

[73] Assignee: Pitney Bowes Inc., Stamford, Conn.

[21] Appl. No.: 09/217,978

[22] Filed: Dec. 21, 1998

[51] Int. Cl.[7] ...................................................... G06F 17/00

[52] U.S. Cl. ............................ 705/410; 705/26; 700/226

[58] Field of Search .................................... 705/401, 408, 705/410, 26, 1; 700/213, 225, 226, 227; 101/71; 283/71; 380/51, 55

[56] References Cited

U.S. PATENT DOCUMENTS 5,903,878 5/1999 Talati et al. ............................... 705/26
5,925,864 7/1999 Sansone et al. ......................... 235/375

*Primary Examiner*—Edward R. Cosimano
*Assistant Examiner*—Thomas A. Dixon
*Attorney, Agent, or Firm*—Charles R. Malandra, Jr.; Michael E. Melton

[57] ABSTRACT

A mailpiece having a postal indicium including information in two dimensional bar code form, the bar coded information including a delivery address which is not otherwise imprinted on the mailpiece surface, and methods and systems for producing such mailpieces in order to protect data such as a mailing list. Delivery information in bar code form is provided by a third party and incorporated in, or appended to, a postal indicium such as an IBIP indicium without disclosure to the party actually producing the mailpiece and without printing the delivery address onto the mailpiece. A postal service scans the delivery address while scanning the postal indicium and determines the delivery information. The delivery information can be an address or can be a pointer to a data base of addresses. Either form of delivery information can be encrypted for increased security.

36 Claims, 5 Drawing Sheets

MAILPIECE IMPRINTED WITH A DELIVERY ADDRESS ONLY IN A FORM WHICH IS NOT HUMAN READABLE AND METHOD AND SYSTEM FOR PRODUCING SAME

BACKGROUND OF THE INVENTION

The subject invention relates to the production of mailpieces. More particularly it relates to mailpieces where the delivery address is not imprinted on the mailpiece in human readable form and which is produced without disclosure of the delivery address to the party producing the mailpiece, and to methods and systems for producing such mailpieces. (The term "mailpiece" as used herein means a letter or package or other item intended for delivery by a postal service or similar organization and may sometimes refer to an envelope or label to be filled or applied at a later point in the production process.)

Mailing lists are critical to the operation, if not the survival, of organizations such as catalogue sales companies, charities, etc. A large list of well qualified prospects can cost thousands of dollars to generate and can have great value to such organizations. The generation and sale of such lists is a substantial and growing business.

Protecting the value of such lists is, however, difficult. Unlike customer lists, use of a mailing list inherently involves its wide distribution. Not only are the delivery addresses imprinted on the mailpieces in human readable form but, more importantly, production of a large mailing will typically involve access by a mail production system computer to the mailing list. The computer of course can easily make any number of copies of the mailing list. Thus sellers must price mailing lists to earn a return with only a few sales, buyers are unwilling to pay a premium for exclusivity, and mailers find that the competitive advantage obtained by developing lists is rapidly lost.

Other situations where it can be desirable to produce mailpieces without disclosing the delivery address to the party producing the mailpieces also exist. For example, a company may want to have its vendors ship directly to its customers without disclosing the identity of the customers to the vendors.

Thus it is an object of the subject invention to provide a mailpiece which is not imprinted with a delivery address in human readable form and methods and systems for producing such a mailpiece without disclosing the delivery address to the party producing the mailpiece.

BRIEF SUMMARY OF THE INVENTION

The above object is achieved and the disadvantages of the prior art are overcome in accordance with the subject invention by means of a mailpiece imprinted with a delivery address in a form which is not human readable, the mailpiece including: a surface; an indicium printed on the surface, the indicium including bar-coded information, the bar-coded information including delivery information defining a delivery address for the mailpiece; and the delivery address not being otherwise visible on the surface in any human readable form. A postal service can scan the bar-coded information to recover the delivery information and determine the delivery address, and the mailpiece can be produced and delivered to the postal service by a party who does not have knowledge of the delivery address.

In accordance with one aspect of the subject invention the bar-coded information further includes information which evidences payment of postage for the mailpiece.

In accordance with another aspect of the subject invention the indicium is accepted by the postal service as proof of payment of the postage.

In accordance with another aspect of the subject invention the indicium includes information identifying a service provider who has provided the delivery information, whereby the postal service can credit a part of the payment to the service provider.

In accordance with another aspect of the subject invention the delivery information is the delivery address.

In accordance with another aspect of the subject invention the delivery information is an encryption of the delivery address.

In accordance with another aspect of the subject invention the delivery information is a pointer to the delivery address in an address data base accessed by the postal service.

In accordance with another aspect of the subject invention the delivery information is an encryption of a pointer to the delivery address in an address data base accessed by the postal service.

In accordance with the subject invention an apparatus and method for producing a mailpiece wherein a party producing the mailpiece does not have knowledge of the mailpiece's delivery address, the producing party having a host data processing system for controlling a printer to print the mailpiece with an indicium, the indicium including bar-coded information, include: programming of a host system to input delivery information defining the delivery address and merge the delivery information into the bar-coded information; a service provider outputting the delivery information to the host system without disclosing the delivery information to the producing party; the host system controlling the printer to print the mailpiece with the indicium; the delivery address not being otherwise visible on the mailpiece's surface in any human readable form In accordance with still another aspect of the subject invention an apparatus and method for producing a mailpiece wherein a party producing the mailpiece does not have knowledge of the mailpiece's delivery address, the producing party having a host data processing system for controlling a printer to print the mailpiece with an indicium, the indicium including bar-coded information, the bar-coded information including delivery information defining a delivery address, include: programming of a host system to input information at least partially specifying the indicium; a service provider generating the input information and communicating the input information to the host system without disclosing the input information to the producing party; the host system controlling the printer to print the mailpiece with the indicium in accordance with the input information.

In accordance with still another aspect of the subject invention an apparatus and method for producing a mailpiece wherein a party producing the mailpiece does not have knowledge of the mailpiece's delivery address, the producing party having a host data processing system for controlling a printer to print the mailpiece with an indicium including bar-coded information, the bar-coded information including information which evidences payment of postage for the mailpiece, include: programming of a host system to input delivery information defining the delivery address; a service provider inputting the delivery information to the host system without disclosing the delivery information to the producing party; the host system controlling the printer to print the mailpiece with the delivery information appended to the indicium in bar-coded form.

In accordance with still yet another aspect of the subject invention an apparatus and method for producing a mailpiece wherein a party producing the mailpiece does not have knowledge of the mailpiece's delivery address, the producing party having a host data processing system for controlling a printer to print the mailpiece with an indicium, include: programming of a host system to input information at least partially specifying the indicium, the indicium comprising bar-coded delivery information appended to an IBIP indicium; a service provider outputting the input information to the host system without disclosing the delivery information to the producing party; the host system controlling the printer to print the mailpiece with the indicium.

Other objects and advantages of the subject invention will be apparent to those skilled in the art from consideration of the detailed description set forth below and the attached drawing.

DETAILED DESCRIPTION OF PREFERRED EMBODIMENTS OF THE INVENTION

Figure 1:
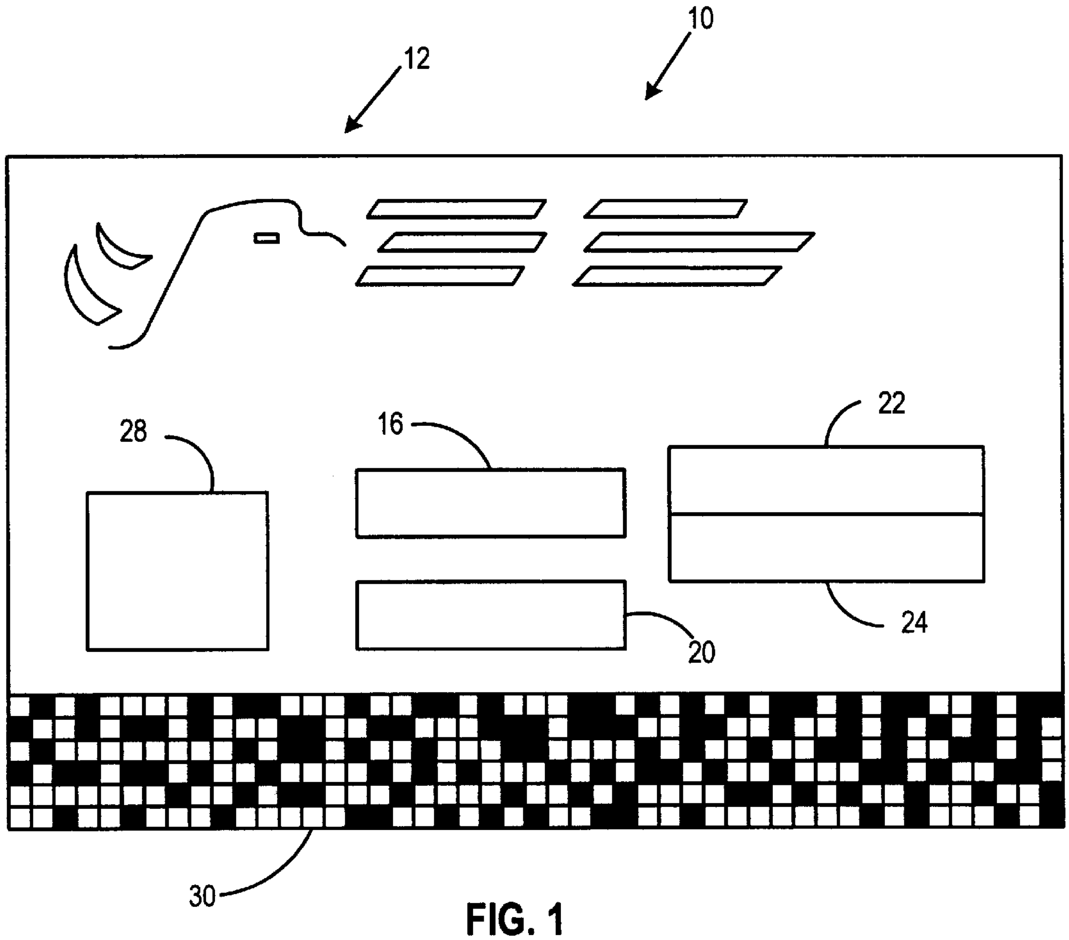
FIG. 1 is a schematic representation of a postal indicium in accordance with the Information Based Indicia Program (hereinafter sometimes "IBIP") of the US Postal Service and including delivery information in two dimensional barcode form.

Postage meters are well known devices which imprint mailpieces with indicia which evidence payment of postage. Since the Postal Service accepts such postal indicia as proof that the indicated amount of postage has been paid it has required that postage meters and print indicia meet high security standards. Originally postage meters met these standards in part by impact printing of indicia using complex print mechanisms which produced elaborate indicia which were difficult to counterfeit. While highly successful for many years recent advances in encryption technology and digital printing technology have created the possibility of new methods for creating secure postal indicia and the US Postal Service has mandated the phased replacement of mechanical postage meters with meters which use digital printing technology.

In line with these developments the US has Postal Service has proposed a new specification for digitally printed postal indicia wherein indicia would include additional information useful to authenticate the indicia and/or to provide the postal service with information useful to monitor and control its operations (hereinafter sometimes IBIP indicia). The above mentioned IBIP, together with specifications for an Open System Postal Security Device (hereinafter sometimes "PSD"), which would enable the printing of IBIP indicia by open data processing systems using conventional digital printers such as laser or ink jet printers is one such standard. These proposed standards are well known in the industry, as are other standard, for similar IBIP indicia, and are set forth in the widely distributed documents:

"INFORMATION BASED INDICIA PROGRAM (IBIP) OPEN SYSTEM INDICIUM SPECIFICATION"; and INFORMATION BASED INDICIA PROGRAM (IBIP) OPEN SYSTEM POSTAL SECURITY DEVICE (PSD) SPECIFICATION; both Prepared for: The United States Postal Service (USPS) Engineering Center Jul. 23, 1997

As set forth in the above cited documents the PSD provides security-critical functions for IBIP customers. The PSD will be a hardware component and each PSD will be a unique security device. The PSD core security functions are cryptographic digital signature generation and verification, the secure management of the registers that track the remaining amount of money available for indicium creation (descending register) and the total postage value used by this PSD (ascending register), and PSD initialization. To ensure the security of IBIP processes, certain core security functions, which are further described below, must be performed by the PSD. In order to securely perform these functions, the PSD will be a tamper-resistant device that will contain an internal random number generator, various storage registers, a date/time clock, and other circuits necessary to perform these functions. The PSD core security functions will support the implementation of the IBIP device authorization, finance, indicium creation, and device audit functions. The PSD ensures that only authorized IBIP customers are able to apply a valid indicium to a mailpiece.

The IBIP authorization process ensures that only an authorized device can support the creation of a valid indicium. The Provider will authorize a PSD for use by a specific licensed customer. Once a PSD is authorized, the finance functions must be performed before the first indicium is created.

The IBIP finance function will download postage value into the PSD from the Provider. In order to download postage into the PSD, the customer must deposit sufficient funds with the USPS who in turn will notify the Provider. To initiate the secure downloading of postage, the PSD will generate a request message for a postage value download. Assuming that the customer has sufficient funds on deposit with the Postal Service, once a download message is received, the PSD will be required to verify the digital signature for the message. After the signature has been verified, the PSD will increase the value contained in the descending register by the added postage value amount contained in the message. The PSD will upload a status message and device audit information to the USPS that reflects the new value of the descending register and the current value of the ascending register.

The PSD and the host system will jointly perform functions necessary to create a valid indicium in accordance with the IBIP Indicium Specification. The PSD will accept input from the host system and use data from its internal storage to create signed data elements for selected fields in the indicium.

The device audit function allows the USPS to ensure proper use of the PSD. To ensure such use, the PSD will create an appropriate device audit message and output it to the host system for transfer to the USPS. The PSD will provide a watchdog timer function. This function will preclude indicia creation if the PSD has not been adequately audited by the USPS.

The IBIP proposal is well understood by those skilled in the mail preparation art and a number of vendors, including the assignee of the present application, have proposed systems responsive to the IBIP. Implementation of such systems is within the ability of those skilled in the art.

In a preferred embodiment of the subject invention indicia 10, as shown in FIG. 1, are generated substantially in compliance with the IBIP specification and include delivery information in bar-coded form. (It should be noted that FIG. 1 is not intended to represent actual indicia or to imply that such an indicia would necessarily be approved by the USPS.)

In FIG. 1, indicium 10 includes graphical elements 12 which make up a Provider's logo and fields 16, 20, 22, 24, 28, and 30. Fields 16, 20, 22, 24, and 28 contain human readable representations of data elements where: field 16 contains the postage, field 20 contains the date, field 22 contains the device ID, field 24 contains the rate category, and field 28 contains the originating address (city, state, ZIP Code). Field 30 contains a bar-coded representation of a plurality of elements including the above described human readable elements (except for the originating address) and additional elements which together are used to provide security for the IBIP or which can be used by the Postal Service to monitor and control operations. In accordance with a preferred embodiment of the subject invention field 30 also includes delivery information which defines a delivery address for a mailpiece, and a service provider ID in bar-coded form. (As used hereinafter the term "bar-coded" refers to data in two dimensional barcode form, such as the well known PDF 417 format, or to any other suitable, sufficiently dense, printed, scanable form of data representation.) A more detailed description of the data elements of field 30 is as follows:

Device ID—This data element represents the unique device identification that consists of a Provider identification and model number followed by the PSD serial number.

Ascending Register—This data element represents the total monetary value of all indicia ever produced by the PSD. This data element is represented in a 5-byte binary field in the numeric format XXX,XXX,XXX.XXX.

Digital Signature—This data element represents the digital signature to provide indicium authenticity. (The size of this data element is a function of the choice of digital signature algorithm. If additional algorithms are approved for use by IBIP, the length of this field will be appropriately specified for those algorithms.)

Postage—This data element represents the amount of postage applied for this specific mailpiece. The postage amount is in the numeric format XX.XXX.

Date of Mailing—This data element represents the date of mailing for a mailpiece and has the numeric format YYYYMMDD in the barcode. The format of the date in the human-readable portion of the indicium is at the discretion of the Provider, except the year, which will be represented by four digits.

Licensing ZIP Code—The licensing delivery point identification shall be a 12-digit numeric value represented by a 5-byte binary field in the indicium. Preferably it represents the Zip Code for the post office at which the mailpiece is deposited.

Destination ZIP Code—This data element contains the 11-digit destination delivery point identification ZIP Code represented by a 5-byte binary field in the indicium.

Software ID—This data element represents the host system software identification 12-digit number, represented by a 6-byte binary field as specified in the IBIP Host System Specification.

Descending Register—This data element represents the remaining postage value on the PSD. This data element is a 4-byte binary field in the numeric format XXX,XXX.XXX.

PSD Certificate—This data element contains the certificate that provides the PSD's public key needed to verify the digital signature. The certificate will be generated by an approved Certifying Authority and loaded into the PSD by the Provider. (The size of this data element is a function of the choice of digital signature algorithm. If any additional algorithms are approved for use by IBIP, the length of this field will be appropriately specified for those algorithms.)

Rate Category—Postage class, including any presort discount level, and rate are represented in this data element. Values for this field will be provided in the DMM. In accordance with a preferred embodiment of the subject invention one or more rate categories can provide a surcharge for mail which is not imprinted with a delivery address in human readable form.

Delivery Information—Information which defines the delivery address for the mailpiece. In preferred embodiments of the subject invention the delivery information can be the actual delivery address (preferably including name and Zip Code) or can be a pointer to the delivery address in a data base of addresses accessible by the Postal Service. (It is believed that the Postal Service maintains suitable address data bases as part of an address hygiene service it provides.) In other preferred embodiments either form of delivery information can be encrypted to provide increased security.

Service Provider ID—Identification of the party who has provided the address. In a preferred embodiment of the subject invention the Postal Service forwards a portion of the above described surcharge to the service provider; allowing the service provider to charge for mailing lists on a per use/per address basis.

Figure 2:
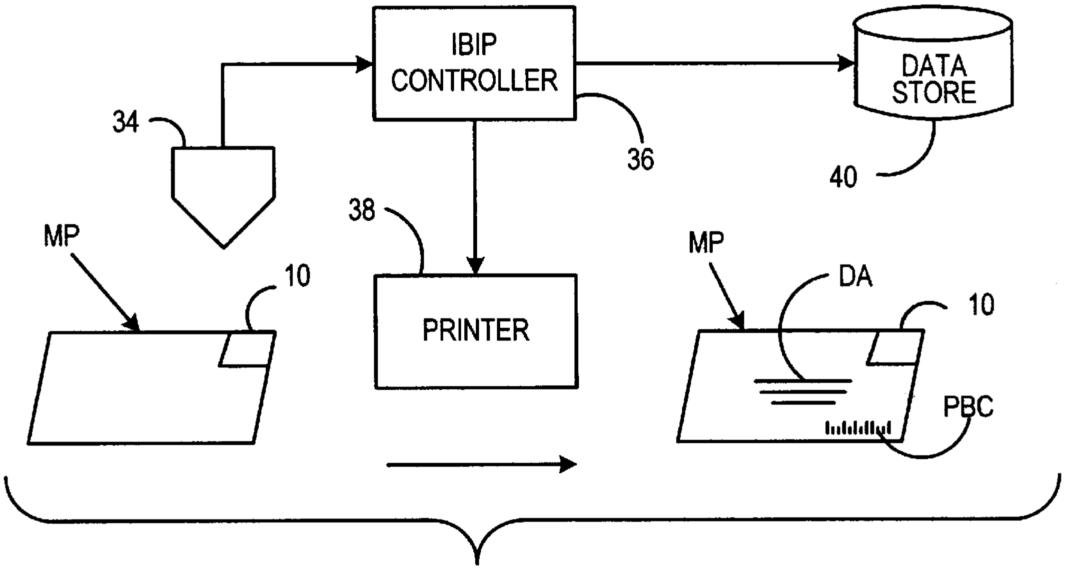
FIG. 2 is a schematic block diagram of a system for scanning an indicium similar to that of FIG. 1.

FIG. 2 shows a scanning system for use by a postal service to scan an indicia such as are shown in FIG. 1. Mailpieces MP are imprinted with indicia 10 and are not otherwise imprinted with a delivery address in human readable form. As mailpieces MP move in the direction of arrow 32, field 30 is scanned by barcode scanned 34 which is controlled by IBIP controller 36. In a preferred embodiment of the subject invention indicia 10 will be scanned for delivery information concurrently as they are scanned for the other IBIP data elements used to carry out IBIP functions such as authenticating indicia 10 as a valid indicia printed by a properly authorized device and recovering other IBIP data elements used to monitor and control postal service operations. Such operations are well known in the art and are more fully described in the above referenced specifications and need not be discussed further for an understanding of the subject invention.

In embodiments of the subject invention wherein the delivery information is a pointer to a data base of delivery addresses, controller 36 will access data store 40 to recover the corresponding delivery address. In embodiments wherein the delivery information is encrypted controller 36 will execute an appropriate, conventional decryption function to recover the delivery address.

Once the delivery address is recovered controller 36 will control printer 38 to print delivery address DA onto mailpiece MP in a conventional manner. In other embodiments of the subject invention a conventional, a one dimensional postal barcode PBC, such as the well known "Postnet" barcode, can be printed onto mailpieces MP to facilitate further sortation of mailpieces MP. Once mailpieces MP are printed with delivery address DA they can thereafter be handled and delivered in a conventional manner.

Figure 3:
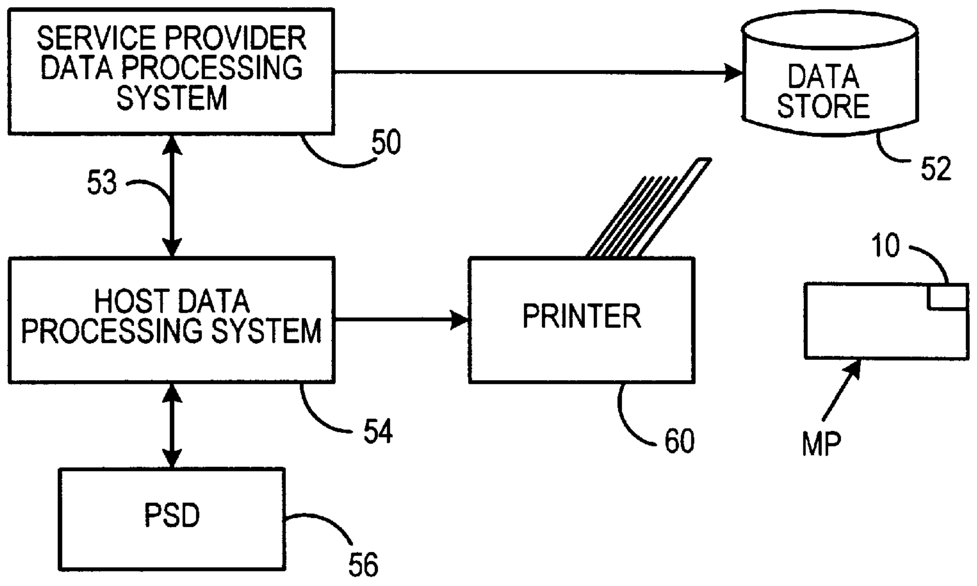
FIG. 3 is a schematic block diagram of a system for producing a mailpiece imprinted with an indicium similar to that of FIG. 1.

FIG. 3 shows a system for generating and printing indicia such as are shown in FIG. 1 where indicia 10 are generated locally by the party producing mailpiece MP. Service provider data processing system 50 accesses data store 52 which stores a data base of delivery information. As discussed above the delivery information can be simply the actual delivery address or, in other embodiments, can be a pointer to a separate data base of delivery addresses accessed by the Postal Service. When system 50 inputs selection criteria for a mailing list, i.e. receives a request for a particular type of mailing list, it accesses data store 52 to recover an appropriate list and down loads the list over communications link 53 to host data processing system 54. Communications link 53 is preferably a digital communications link but can be any convenient link, including physical transport of the lists on portable media Host data processing system 54 receives the list, combines it with other mailpiece information required to be included in indicia 10 and uploads the combined information to PSD 56 for generation of security information, including digital signatures, to validate indicia 10, receives a reply from PDS 56, bar-codes and formats all the information in accordance with the above IBIP specifications and controls printer 60 to print indicia 10 onto mailpieces MP.

Note that, in accordance with the subject invention, the delivery information is not disclosed to the party who controls host system 54; i.e. the party producing mailpiece MP, in order to maintain security of the mailing list. The degree of this security varies in different embodiments of the subject invention. As discussed above, in the simplest embodiments the delivery information is simply the actual delivery address. In this embodiment security is provided by no more than the facts that the list is only transiently resident in host system 54 and delivery addresses are not directly human readable from mailpieces. Clearly this is a low level of security but it may be considered sufficient for lists of low value. For lists of greater value, the delivery information can be a pointer to an address data base accessed by the Postal Service. And for lists of high value either form of delivery information can be encrypted.

Figure 4:
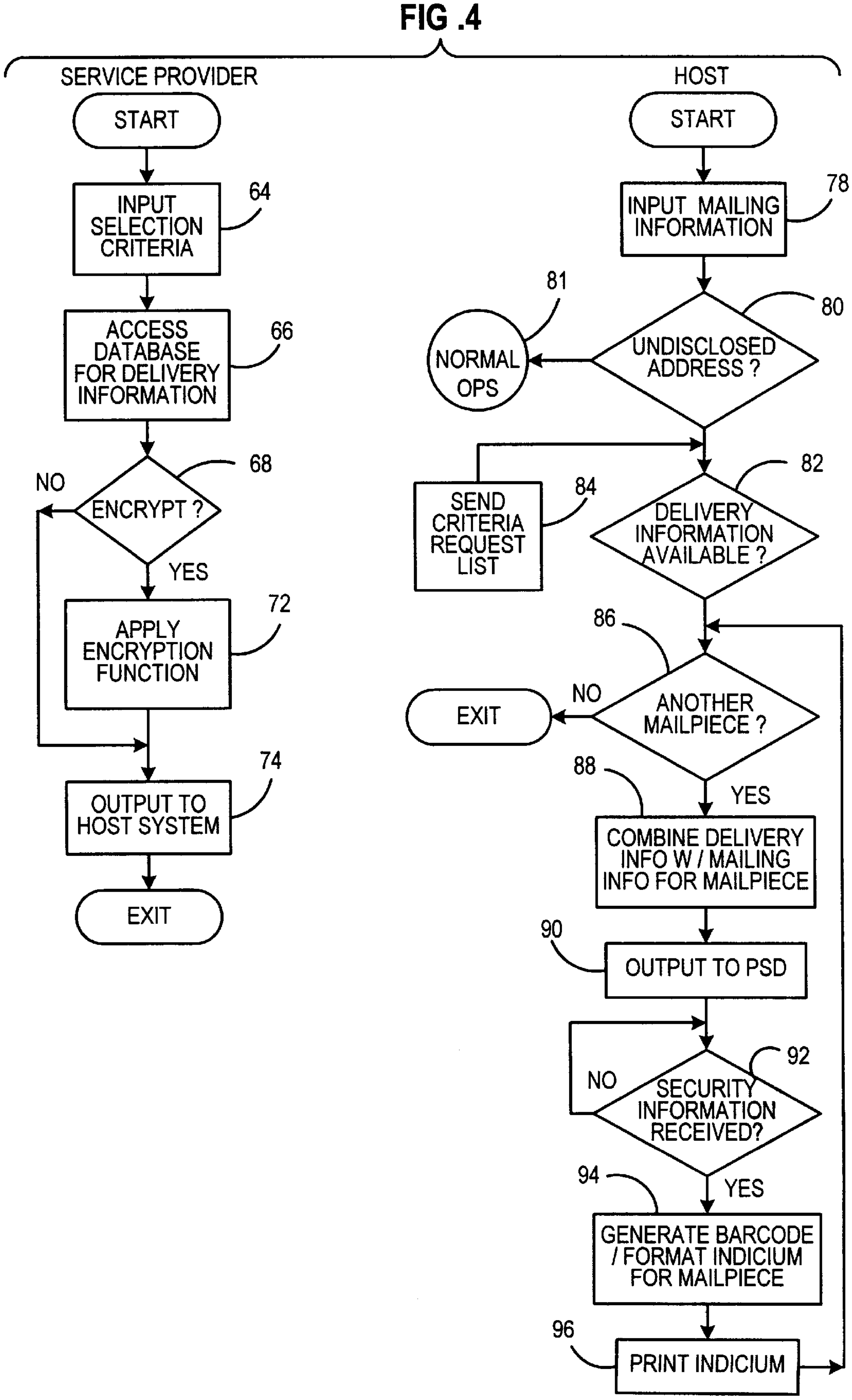
FIG. 4 is a flow diagram of the operation of the system of FIG. 3.

FIG. 4 shows a flow diagram of the operation of the system of FIG. 3. At 64 system 50 inputs selection criteria (which can range from identification of an existing list to a complex set of desired characteristics to be used by system 50 to assemble a unique mailing list). At 66 system 50 accesses data store 52 to recover the selected list from a data base of delivery information stored therein. At 68 system 50 determines if the delivery information is to be encrypted and if so applies a conventional encryption function at 72 and then outputs the selected list of delivery information to host system 54 at 74. Other wise system 50 goes directly to 74 to output an unencrypted list and exit.

At 78 host system 54 inputs mailing information which specifies information other than delivery information to be incorporated into indicium 10; e.g. the postage amount. At 80 system 54 determines if the mailing has undisclosed addresses and is to be processed in accordance with the subject invention. If not, at 81 system 54 returns to normal mail processing operations which are not within the scope of the subject invention. Otherwise, at 82 system 54 determines if a mailing list of delivery information is available. If not, at 84 a list meeting the appropriate criteria, as determined from the mailing information, is requested, and the system returns to 82 to wait. When delivery information is available system 54 determines if another mailpiece is to be processed at 86. If not the system exits. Otherwise, at 88 system 54 combines mailing information and delivery information for the mailpiece to define the data elements of indicium 10 for mailpiece MP and, at 90 outputs the combined information to PSD 56 to generate a digital signature and other security information as described above for indicium 10. At 92 system 54 waits for PSD 56 to return security information and when the security information is received, at 94 generates bar-coded data elements as described above and formats indicium 10, and controls printer 60 to print indicium 10 onto mailpiece MP, and returns to 86.

By merging the delivery information into indicia 10 the Postal Service can be assured that the delivery address printed onto mailpiece MP by the Postal Service was derived from an authorized device. However in many applications this assurance may not be required. In such cases the operation of host system 54 can be simplified by not merging the delivery information into indicium 10, i.e. not processing it as an element of an IBIP indicia, but simply directly converting it to bar-coded form and appending the bar-coded delivery information to a conventional IBIP indicium. (By "appending" herein is met printing in a location on mailpiece MP such that the bar-coded delivery information can be conveniently scanned concurrently with a conventional IBIP indicium.)

Figure 5:
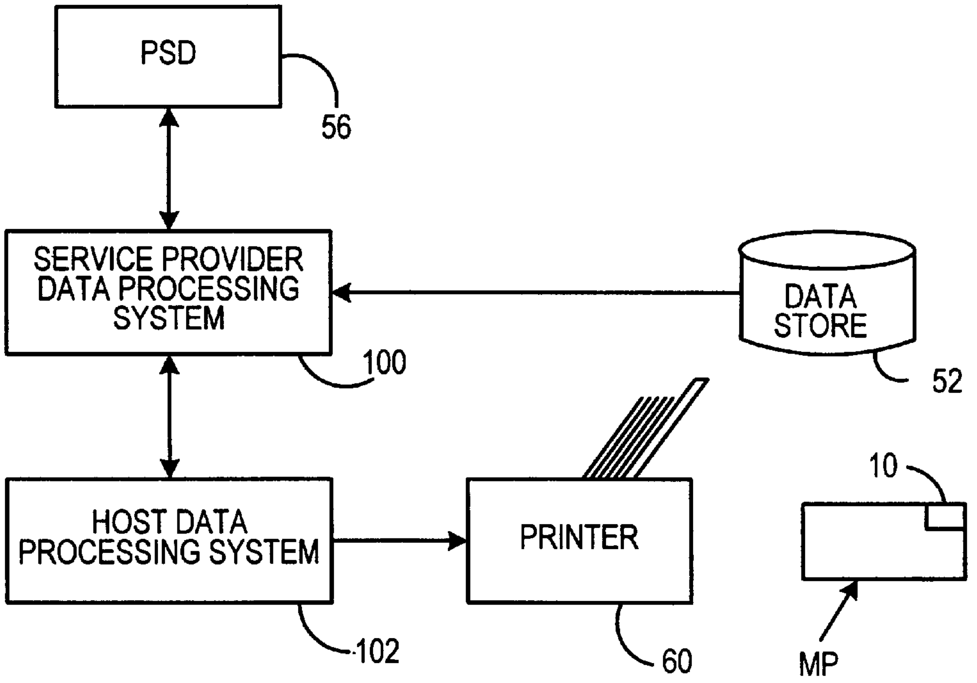
FIG. 5 is a schematic block diagram of another system for producing a mailpiece imprinted with an indicium similar to that of FIG. 1.

FIG. 5 shows a system for generating and printing indicia such as is shown in FIG. 1 where indicia 10 are generated remotely by the service provider providing delivery information for mailpieces MP. Service provider data processing system 100 accesses data store 52 which stores a data base of delivery information. As discussed above the delivery information can be simply the actual delivery address or in other embodiments can be a pointer to a separate data base of delivery addresses accessed by the Postal Service. When system 100 determines selection criteria for a mailing list from mailing information for a mailing, it accesses data store 52 to recover an appropriate list, combines it with other mailpiece information required to be included in indicia 10 and uploads the combined information to PSD 56 for generation of digital signatures to validate indicia 10, receives a reply from PDS 56, and bar-codes and formats all the information in accordance with the above IBIP specifications. System 100 then down loads indicia 10, in digital form, over communications link 53 to host data processing system 102. Communications link 53 is preferably a digital communications link but can be any convenient link, including physical transport of the lists on portable media Host data processing system 102 receives the indicia, and controls printer 60 to print indicia 10 onto mailpieces MP.

Figure 6A:
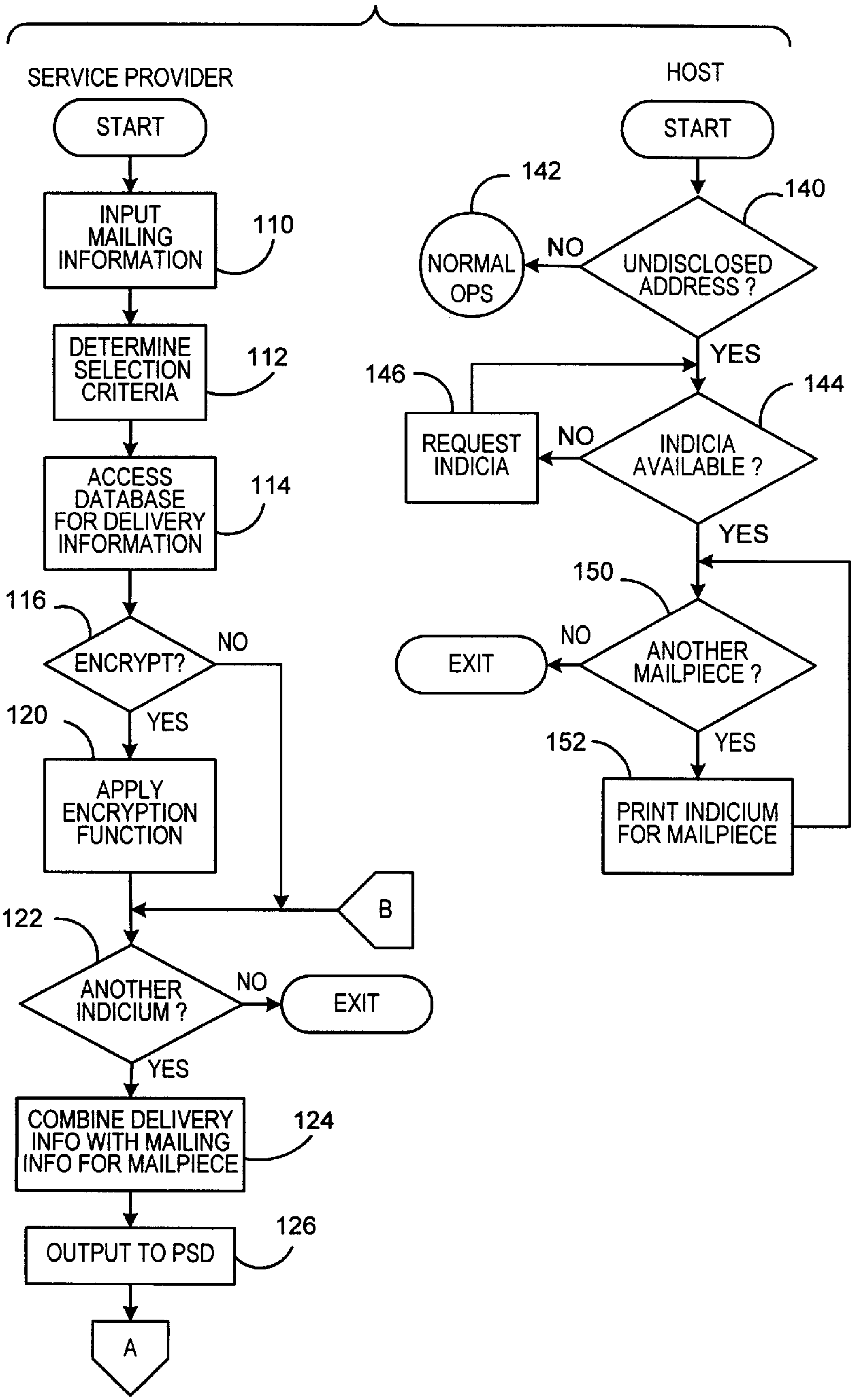
FIGS. 6A and 6B are a flow diagram of the operation of the system of FIG. 5.
Figure 6B:
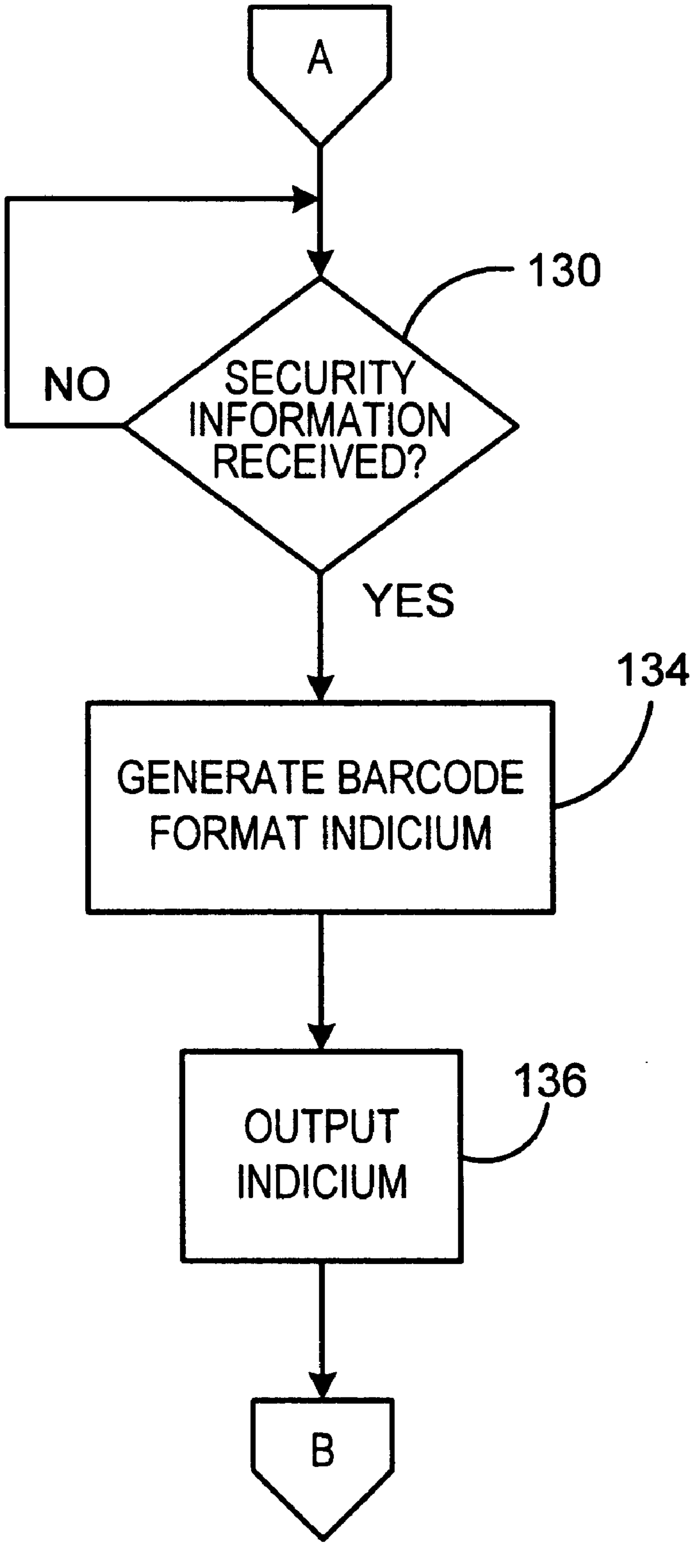

FIGS. 6A and 6B show a flow diagram of the operation of the system of FIG. 5. At 110 system 100 inputs mailing information, and at 112 determines selection criteria for an appropriate mailing list. At 114 system 100 accesses data store 52 to recover the selected list. At 116 system 100 determines if the delivery information is to be encrypted and if so applies a conventional encryption function at 120 and goes to 122. Otherwise system 100 goes directly to 122. At 122 system 100 determines if another indicium is to be produced. If not the system exits. Otherwise at 124 system 100 combines mailing information and delivery information for the mailpiece to define the data elements of indicium 10 for mailpiece MP and, at 126, outputs the combined information to PSD 56 to generate a digital signature and other security information, as described above, for indicium 10. At 130 system 100 waits for PSD 56 to return security information and when the security information is received, at 134 generates bar-coded data elements as described above and formats indicium 10, and then digitally outputs an indicium 10 corresponding to each mailpiece, and including the corresponding element of delivery information from the selected list of delivery information, to host system 102 at 136, and returns to 122.

At 140 host system 102 determines if the mailing has undisclosed addresses. If not at 142 system 102 returns to normal mail processing operations which are not within the scope of the subject invention. Otherwise at 144 system 102 determines if indicia are available. If not, at 146 indicia are requested, and the system returns to 144 to wait. When indicia are available system 102 determines if another mailpiece is to be printed. If not the system exits, Otherwise, at 152, system 102 controls printer 60 to print indicium 10 onto mailpiece MP, and returns to 150.

In other embodiments of the subject invention the information input by host system 102 does not fully specify indicia 10 but only specifies those data elements which are used by PSD 56 to generate security information and delivery information and other data elements, e.g. the date, barcode conversion, formatting are provided by system 102.

As described above with respect to FIGS. 3 and 4, bar-coded delivery information can be appended to a conventional IBIP indicium with only a minor change to operation of service provider system 100.

The embodiments described above and illustrated in the attached drawings have been given by way of example and illustration only. From the teachings of the present application those skilled in the art will readily recognize numerous other embodiments in accordance with the subject invention. Particularly, it is contemplated that the subject invention can incorporate forms of IBIP indicia other than that specified by the USPS in the above referenced documents. Accordingly, limitations on the subject invention are to be found only in the claims set forth below.

What is claimed is:

1. A mailpiece imprinted with a delivery address in a form which is not human readable, the mailpiece comprising:

a) a surface;

b) an indicium printed on the surface, the indicium including bar-coded information, the bar-coded information including delivery information defining a delivery address for the mailpiece; and c) the delivery address not being otherwise visible on the surface in any human readable form; whereby d) a postal service can scan the bar-coded information to recover the delivery information and determine the delivery address, and the mailpiece can be produced and delivered to the postal service by a party who does not have knowledge of the delivery address.

2. A mailpiece as described in claim 1 wherein the bar-coded information further includes information which evidences payment of postage for the mailpiece.

3. A mailpiece as described in claim 2 wherein the indicium is accepted by the postal service as proof of payment of the postage.

4. A mailpiece as described in claim 2 wherein the indicium includes information identifying a service provider who has provided the delivery information, whereby the postal service can credit a part of the payment to the service provider.

5. A mailpiece as described in claim 1 wherein the delivery information is the delivery address.

6. A mailpiece as described in claim 1 wherein the delivery information is an encryption of the delivery address.

7. A mailpiece as described in claim 1 wherein the delivery information is a pointer to the delivery address in an address data base accessed by the postal service.

8. A mailpiece as described in claim 1 wherein the delivery information is an encryption of a pointer to the delivery address in an address data base accessed by the postal service.

9. A method for producing a mailpiece wherein a party producing the mailpiece does not have knowledge of the mailpiece's delivery address, the producing party having a host data processing system for controlling a printer to print the mailpiece with an indicium, the indicium including bar-coded information, the method comprising the steps of:

a) programming the host system to input delivery information defining the delivery address and merge the delivery information into the bar-coded information;

b) a service provider outputting the delivery information to the host system without disclosing the delivery information to the producing party;

c) the host system controlling the printer to print the mailpiece with the indicium;

d) the delivery address not being otherwise visible on the mailpiece's surface in any human readable form; whereby e) a postal service can scan the bar-coded information to recover the delivery information and determine the delivery address, and the mailpiece can be produced and delivered to the postal service by the producing party without knowledge of the delivery address.

10. A method for producing a mailpiece as described in claim 9 wherein the bar-coded information further includes information which evidences payment of postage for the mailpiece.

11. A method for producing a mailpiece as described in claim 10 wherein the indicium is accepted by the postal service as proof of payment of the postage.

12. A method for producing a mailpiece as described in claim 9 wherein the delivery information is the delivery address.

13. A method for producing a mailpiece as described in claim 9 wherein the delivery information is a pointer to the delivery address in an address data base accessed by the postal service.

14. A method for producing a mailpiece as described in claim 9 wherein the delivery information is encrypted.

15. A method for producing a mailpiece as described in claim 9 wherein the host system communicates with a postal security device, the postal security device encrypting at least some of the bar-coded information, the encrypted bar-coded information being incorporated into the indicium to provide assurance that the indicium is authorized.

16. A method for producing a mailpiece wherein a party producing the mailpiece does not have knowledge of the mailpiece's delivery address, the producing party having a host data processing system for controlling a printer to print the mailpiece with an indicium, the indicium including bar-coded information, the bar-coded information including delivery information defining a delivery address, the method comprising the steps of:

a) programming the host system to input information at least partially specifying the indicium;

b) a service provider generating the input information and communicating the input information to the host system without disclosing the input information to the producing party;

c) the host system controlling the printer to print the mailpiece with the indicium in accordance with the input information;

d) the delivery address not being otherwise visible on the mailpiece's surface in any human readable form; whereby e) a postal service can scan the bar-coded information to recover the delivery information and determine the delivery address, and the mailpiece can be produced and delivered to the postal service by the producing party without knowledge of the delivery address.

17. A method for producing a mailpiece as described in claim 16 wherein the bar-coded information further includes information which evidences payment of postage for the mailpiece.

18. A method for producing a mailpiece as described in claim 17 wherein the indicium is accepted by the postal service as proof of payment of the postage.

19. A method for producing a mailpiece as described in claim 16 wherein the delivery information is the delivery address.

20. A method for producing a mailpiece as described in claim 16 wherein the delivery information is a pointer to the delivery address in an address data base accessed by the postal service.

21. A method for producing a mailpiece as described in claim 16 wherein the delivery information is encrypted.

22. A method for producing a mailpiece wherein a party producing the mailpiece does not have knowledge of the mailpiece's delivery address, the producing party having a host data processing system for controlling a printer to print the mailpiece with an indicium including bar-coded information, the bar-coded information including information which evidences payment of postage for the mailpiece, the method comprising the steps of:

a) programming the host system to input delivery information defining the delivery address;

b) a service provider inputting the delivery information to the host system without disclosing the delivery information to the producing party;

c) the host system controlling the printer to print the mailpiece with the delivery information appended to the indicium in bar-coded form;

d) the delivery address not being otherwise visible on the mailpiece's surface in any human readable form; whereby e) a postal service can scan the bar-coded delivery information to recover the delivery information and determine the delivery address, and the mailpiece can be produced and delivered to the postal service by the producing party without knowledge of the delivery address.

23. A method for producing a mailpiece as described in claim 22 wherein the delivery information is the delivery address.

24. A method for producing a mailpiece as described in claim 22 wherein the delivery information is a pointer to the delivery address in an address data base accessed by the postal service.

25. A method for producing a mailpiece as described in claim 22 wherein the delivery information is encrypted.

26. A method for producing a mailpiece wherein a party producing the mailpiece does not have knowledge of the mailpiece's delivery address, the producing party having a host data processing system for controlling a printer to print the mailpiece with an indicium, the method comprising the steps of:

a) programming the host system to input information at least partially specifying the indicium, the indicium comprising bar-coded delivery information appended to an IBIP indicium;

b) a service provider outputting the input information to the host system without disclosing the delivery information to the producing party;

c) the host system controlling the printer to print the mailpiece with the indicium;

d) the delivery address not being otherwise visible on the mailpiece's surface in any human readable form; whereby e) a postal service can scan the bar-coded delivery information to recover the delivery information and determine the delivery address, and the mailpiece can be produced and delivered to the postal service by the producing party without knowledge of the delivery address.

27. A method for producing a mailpiece as described in claim 26 wherein the delivery information is the delivery address.

28. A method for producing a mailpiece as described in claim 26 wherein the delivery information is a pointer to the delivery address in an address data base accessed by the postal service.

29. A method for producing a mailpiece as described in claim 26 wherein the delivery information is encrypted.

30. A system for generating delivery information to be printed on mailpieces, comprising:

a) a data store for storing delivery information defining a plurality of delivery addresses;

b) a service provider data processing system;

c) a communications link for communicating information from the service provider system to a host data processing system controlling a printer for printing the mailpieces;

d) the service provider system being programmed to:

d1) input selection criteria for selecting a list of the delivery addresses;

d2)access the data store to retrieve selected delivery information each element of the selected delivery information defining a delivery address on the list;

d4) communicate the delivery information to the host system without disclosing the delivery information to a party producing the mailpieces.

31. A system as described in claim 30 wherein the delivery information is the delivery address.

32. A system as described in claim 30 wherein the delivery information is an encryption of the delivery address.

33. A system as described in claim 30 wherein the delivery information is a pointer to the delivery address in an address data base accessed by the postal service.

34. A system as described in claim 30 wherein the delivery information is an encryption of a pointer to the delivery address in an address data base accessed by the postal service.

35. A system as described in claim 30 wherein the service provider system is further programmed to generate indicia information defining indicia, each of the indicia including an element of the delivery information in bar-coded form and including bar-coded information which evidences payment of postage for the mailpiece.

36. A system as described in claim 30 wherein the service provider system communicates with a postal security device, the postal security device encrypting at least some of the bar-coded information, the encrypted bar-coded information being incorporated into the indicium to provide assurance that the indicium is authorized.

* * * * *